July 18, 1967  J. TRIFILETTI ET AL  3,331,477
HYDRAULIC BRAKE-CONTROLLED THROTTLE CUT-OUT SYSTEM
Filed May 21, 1965
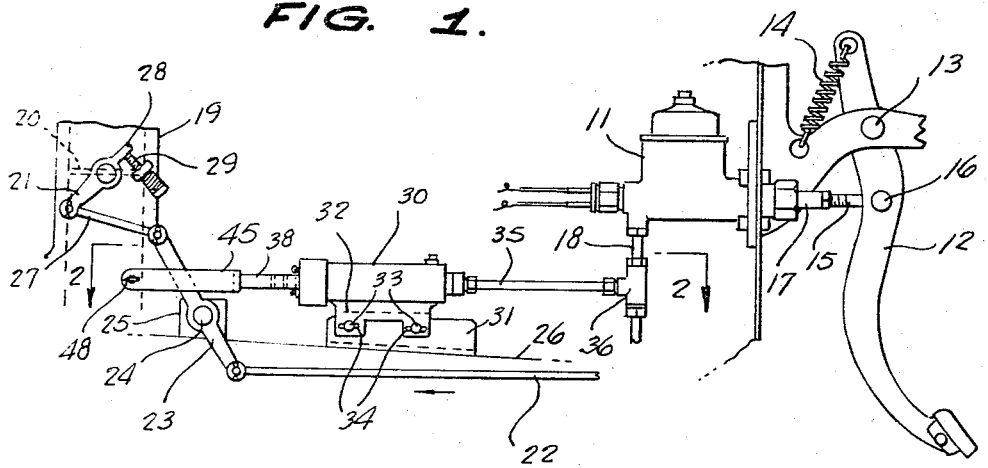
FIG. 1.
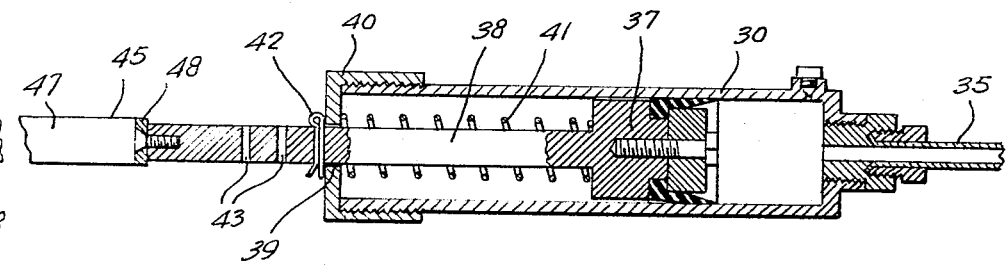
FIG. 2.
FIG. 3.
INVENTORS
JOSEPH TRIFILETTI,
THOMAS TRIFILETTI,
BY
Berman, Davidson & Berman
ATTORNEYS.

United States Patent Office 3,331,477
Patented July 18, 1967

3,331,477
HYDRAULIC BRAKE-CONTROLLED THROTTLE CUT-OUT SYSTEM
Joseph Trifiletti, 25 Birchtree Road, Albany, N.Y. 12205, and Thomas Trifiletti, 9 North St., West Albany, N.Y. 12204
Filed May 21, 1965, Ser. No. 457,677
2 Claims. (Cl. 192—3)

ABSTRACT OF THE DISCLOSURE

Automatic throttle-closing means for a motor vehicle consisting of a hydraulic cylinder connected to the vehicle master cylinder and having a piston rod extensible simultaneously with the actuation of the vehicle brakes. A yoke is secured to the piston rod and the hydraulic cylinder is mounted so that the yoke loosely receives the upper portion of a pivoted lever connected between the accelerator pedal linkage and the carburetor throttle valve of the vehicle, the lever upper portion being connected to the throttle valve. Extension of the piston rod accompanying application of the brakes causes the yoke to push the upper portion of the lever in a direction to close the throttle valve.

---

This invention relates to safety devices for motor vehicles, and more particularly to means for automatically cutting off the fuel supply to the engine of a motor vehicle when the hydraulic brakes of the vehicle are actuated.

A main object of the invention is to provide a novel and improved safety system for automatically cutting off the fuel supply to the engine of a motor vehicle when the hydraulic brake system of the vehicle is operated, thus preventing accidental acceleration of the vehicle at this time, thereby providing safer stops, preventing excessive wear of brake parts, avoiding unnecessary loading of the motor vehicle engine, increasing gas mileage, and preventing accidents, the system involving relatively simple and inexpensive parts which may be easily installed either as original equipment, or in an existing vehicle, which may be installed without the necessity of making any substantial changes to the parts of a vehicle, and being very compact in size.

A further object of the invention is to provide an improved safety apparatus for a motor vehicle which automatically closes the throttle of the vehicle, thereby cutting off its fuel supply, responsive to the depression of the vehicle brake pedal, the system being reliable in operation, being easy to maintain in working condition, and being adjustable so that it may be installed in a wide variety of designs of motor vehicles.

Further objects and advantages of the invention will become apparent from the following description and claims, and from the accompanying drawings, in which:

FIGURE 1 is an elevational view showing the parts of the safety system according to the present invention, and showing the relationship of the elements of the safety system with the master cylinder of a motor vehicle and the throttle-operating linkage thereof.

FIGURE 2 is a horizontal cross-sectional view taken substantially on the line 2—2 of FIGURE 1.

FIGURE 3 is an enlarged vertical cross-sectional view taken substantially on the line 3—3 of FIGURE 2.

Referring to the drawings, 11 designates the conventional master cylinder associated with a motor vehicle brake system, the master cylinder being operated in the usual manner by the pivoted brake pedal 12, said brake pedal being pivoted at 13 and being biased in a counterclockwise direction, as viewed in FIGURE 1, by coiled spring 14. An arm 15 is pivoted at 16 to the brake pedal and is connected to the plunger rod 17 of master cylinder 11. When the brake pedal 12 is depressed, namely, is rotated in a clockwise direction, as viewed in FIGURE 1, the master cylinder operates to force hydraulic fluid under pressure through an outlet conduit 18 leading to the respective wheel-brake cylinders.

The vehicle is provided with a conventional carburetor 19 having the pivoted flap valve 20 which is provided with an operating arm 21 connected by a conventional linkage to the accelerator pedal of the vehicle, the linkage including a substantially longitudinally-extending rod 22 which is connected to the bottom arm of a lever 23 pivoted at 24 to a fixed portion of the vehicle, such as a bracket 25 attached to the engine block 26. The top end of the lever 23 is connected by a link rod 27 to the flap valve-actuating arm 21. The arm 21 is provided at its upper end with an abutment element 28 which is engageable with an adjustable stop screw 29 to limit the clockwise rotation of the flap valve element 20 to a position corresponding to the idling condition of the engine. The stop screw 29 is suitably mounted in a conventional manner on the carburetor 19. The carburetor 19 and the parts associated therewith are entirely conventional and form no part of the present invention.

Designated at 30 is a hydraulic cylinder which is mounted in a substantially horizontal position on a bracket 31 secured to the engine block 26, or to any other convenient fixed portion of the motor vehicle, the cylinder being provided with a depending supporting flange 32 which is adjustably secured to the upstanding bracket element 31 by means of a pair of bolts 33, 33 engaged through horizontal slots 34, 34 provided in the depending flange 32, thus enabling the cylinder 30 to be adjusted longitudinally, as required. The forward end of cylinder 30 is connected by a conduit 35 to the brake line 18, for example, by means of a T-fitting 36, as shown.

Cylinder 30 is provided with a plunger 37 having the plunger rod 38 which extends slidably through a central aperture 39 provided in the end cap 40 of the cylinder, the plunger 37 being biased forwardly, namely, to the right, as viewed in FIGURE 2, by a coiled spring 41 which surrounds rod 38, bearing between the plunger head and the cap 40. The rightward movement of the rod 38 is limited by the provision of a cotter pin 42 which is engaged through a selected aperture 43 in the external portion of the plunger rod 38. As shown, a plurality of apertures 43 are provided at spaced locations along the rod 38, the pin 42 being engaged in a selected aperture 43 so as to limit the inward movement of the rod 38 to a desired limiting position.

Secured to the end of the rod 38 is a generally U-shaped yoke member 45 which receives the upper portion of the fuel valve-control lever 23. As shown in FIGURES 1 and 2, the yoke member 45 is located in a plane above and parallel to the pivotal axis of the pivot connection 24 of the lever 23 and in a plane perpendicular to the plane of movement of the lever 23, so that the upper portion of lever 23 moves in a plane parallel to and spaced substantially midway between the side arms 47, 47 of yoke 45. A cotter pin 48 is engaged transversely through the free end portions of the side arms 47, 47 to thereby define an elongated ring or enclosure surrounding the upper portion of lever 23.

The cylinder 30 and parts associated therewith are arranged in a position such that when the plunger 37 is actuated by the admission of fluid under pressure in the right-end portion of cylinder 30, the rod 38 is extended to the left, as viewed in the drawings, and the bight portion 48 of yoke 45 engages the upper portion of lever 23, rotating the lever in a counterclockwise direction, as viewed in FIGURE 1, thereby rotating arm 21 and flap valve 20 clockwise toward the idling position of the flap valve. Thus, when the brake pedal 12 is actuated, namely, is rotated clockwise, as viewed in FIGURE 1, hydraulic fluid forced through the line 18 also passes through conduit 35 into cylinder 30 and operates said cylinder 30 to cause the rod 38 to move leftward. When this occurs, the bight portion 48 of yoke 45 engages the upper portion of lever 23, rotating the lever counterclockwise and causing the flap valve 20 to be rotated to a position wherein the lug element 28 engages the stop screw 29, namely, toward the idling position of the flap valve. This automatically reduces the supply of fuel to the engine and causes it to slow down when the brakes are applied.

When the brake pedal 12 is released, the spring 41 returns plunger 37 rightward toward its normal position, whereby the bight portion 48 of yoke 45 disengages from lever 23 and allows normal operation of the operating linkage associated with the fuel control flap valve 20.

As will be readily apparent, the provision of the safety system above-described prevents accidental acceleration of the motor vehicle when the brake pedal of the vehicle is operated, since the action of the master cylinder 11 not only operates the wheel-brake cylinders, but also provides positive resistance to the operation of the accelerator linkage. Therefore, it is impossible to accelerate when the brakes are applied. This provides safer stops, prevents unnecessary wear and tear on the brakes, prevents unnecessary loading of the vehicle engine, and increases gas mileage. The parts are relatively simple and can be easily installed on a wide range of different designs of motor vehicles without involving any substantial modification of the vehicle on which it is installed, the only modification required being the provision of a T-fitting 36 in the brake line 18.

While a specific embodiment of an improved motor vehicle safety system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a motor vehicle provided with a hydraulic brake master cylinder having an output line and provided with a brake-operating pedal and a carburetor having a fuel valve and a rotatable valve-operating lever pivoted to the vehicle at its mid-portion and having one end portion thereof connected to said fuel valve, an accelerator pedal pivoted to the vehicle and connected to the other end portion of the lever, said lever being movable from a valve-closing position to a valve-opening position, a hydraulic cylinder mounted on the vehicle and having a plunger rod extending adjacent said one end portion of the lever and extending generally in the same direction as the plane of rotation of said lever, a yoke member on the rod loosely receiving said one end portion of the lever and moving the lever toward said valve-closing position responsive to extension of the rod, and conduit means connecting the last-named cylinder to said output line, whereby the valve-operating lever is urged toward valve-closing position when the brake pedal is actuated.

2. In combination, a motor vehicle provided with a hydraulic brake master cylinder having an output line and provided with a brake-operating pedal and a carburetor having a fuel valve and a rotatable valve-operating lever pivoted to the vehicle at its mid-portion and having one end portion thereof connected to said fuel valve, an accelerator pedal pivoted to the vehicle and connected to the other end portion of the lever, said lever being movable from a valve-closing position toward a valve-opening position, a hydraulic cylinder mounted on the vehicle and having a plunger rod extending adjacent said one end portion of the lever and being located substantially in the plane of rotation of said lever, a yoke member secured to the end of said rod and having parallel side arms extending substantially parallel to the plane of rotation of said lever, said yoke member loosely receiving said one end portion of the lever between said side arms, the yoke member being engageable with said one end portion of the lever to move the lever toward said valve-closing position responsive to extension of the rod, and conduit means connecting the last-named cylinder to said output line, whereby the valve-operating lever is urged toward valve-closing position when the brake pedal is actuated.

References Cited
UNITED STATES PATENTS

| | | | |
|---|---|---|---|
| 1,633,360 | 6/1927 | Bragg et al. | 192—3 |
| 2,642,165 | 6/1953 | Banker | 192—3 |
| 2,713,404 | 7/1955 | Rodeback | 192—1 |
| 2,781,116 | 2/1957 | Watson | 192—3 |
| 2,990,825 | 7/1961 | Fuller et al. | 192—3 |

BENJAMIN W. WYCHE, III, *Primary Examiner.*

DAVID J. WILLIAMOWSKY, *Assistant Examiner.*